(12) United States Patent
Tseng et al.

(10) Patent No.: US 8,918,599 B2
(45) Date of Patent: Dec. 23, 2014

(54) INTEGRATED STORAGE PLATFORM SYSTEM AND METHOD THEREOF

(71) Applicant: National Chiao Tung University, Hsinchu (TW)

(72) Inventors: Chien-Chao Tseng, Hsinchu (TW); Cheng-Yun Ho, Taipei (TW); Chia-Liang Lin, Pingtung (TW); Chieh Wu, Taipei (TW)

(73) Assignee: National Chiao Tung University, Hsinchu (TW)

( * ) Notice: Subject to any disclaimer, the term of this patent is extended or adjusted under 35 U.S.C. 154(b) by 130 days.

(21) Appl. No.: 13/679,129

(22) Filed: Nov. 16, 2012

(65) Prior Publication Data

US 2014/0052939 A1 Feb. 20, 2014

(30) Foreign Application Priority Data

Aug. 14, 2012 (TW) .............................. 101129347 A (51) Int. Cl.
*G06F 12/00* (2006.01)
(52) U.S. Cl.
CPC ..................................... *G06F 12/00* (2013.01)
USPC ........................................................ 711/154
(58) Field of Classification Search
CPC ....................................................... G06F 12/00
See application file for complete search history.

(56) References Cited

U.S. PATENT DOCUMENTS

| 7,409,392 | B2 * | 8/2008 | Greer et al. | .................... 707/802 |
| 8,209,442 | B2 | 6/2012 | Ma et al. | |
| 2005/0066109 | A1 * | 3/2005 | Veazey et al. | ...................... 711/1 |

FOREIGN PATENT DOCUMENTS

TW 201216758 A1 4/2012

OTHER PUBLICATIONS

C. Baru et al, The SDSC Storage Resource Broker, in Proceeding of CASCON'98 Conference, 1998, pp. 1-12.
J. Ni et al, FRB: File Resource Broker for Integrating Heterogeneous File Resources, Eighth International Conference on Grid and Cooperative Computing, 2009, pp. 281-286.
H. Han et al, A Scheme to Construct Global File System, Web Information System Engineering, 2002, pp. 206-212.
P. Xu et al, Campus Cloud for Data Storage and Sharing, Eighth InternationalConference on Grid and Cooperative Computing, 2009, pp. 244-249.

* cited by examiner

*Primary Examiner* — Hiep Nguyen
(74) *Attorney, Agent, or Firm* — Muncy, Geissler, Olds & Lowe, P.C.

(57) ABSTRACT

The present invention discloses an integrated storage platform system and a method thereof. The system comprises at least one adaption module respectively connecting with at least one storage space and each performing a plurality of adaption settings corresponding to one storage space; a storage administration module connecting with the adaption modules and processing the files of the storage spaces; and an access interface connecting the storage administration module, operated by a user to access the storage space through the storage administration module and the adaption module, and presenting access results to the user. The present invention establishes different adaption modules to enable the user to link to and access different types of storage spaces.

14 Claims, 8 Drawing Sheets

INTEGRATED STORAGE PLATFORM SYSTEM AND METHOD THEREOF

BACKGROUND OF THE INVENTION

1. Field of the Invention

The present invention relates to a cloud-based storage technology, particularly to an integrated storage platform system and a method thereof.

2. Description of the Related Art

With popularization of the Internet, many cloud-based storage services appear in the Internet. Although there have been mechanisms to integrate storage spaces, backup files and share data, those mechanisms have some problems, including the user have to deal with different operating environments of different storage services; the user have to administrates a plurality of service account numbers; network-based storage service is hard to integrate with personal storage devices; the network-based storage service only supports file access.

For an example, a scheme for constructing a global file system provides a single-interface virtual file system for different FTP servers to overcome the problem that a user has to administrate a plurality of account numbers and deal with different operating environments. However, the scheme can only provide a unitary access interface for FTP servers. It cannot enable the user to access the cloud-based storage spaces commonly seen in the Internet nowadays. For another example, a technology, named Campus Cloud for Data Storage and Sharing, provides the user with a single-interface access service to access different file systems. For the inaccessible file systems, the technology needs to install additional FTP servers to provide Internet access service of the files; the user's computer cannot have the personal service to access the files.

Accordingly, the present invention proposes an integrated storage platform system and a method thereof to overcome the abovementioned problems.

SUMMARY OF THE INVENTION

The primary objective of the present invention is to provide an integrated storage platform system and a method thereof, which virtualize files to convert diversified storage services into a single-interface service, whereby the user can use a single interface to access different types of storage spaces.

Another objective of the present invention is to provide an integrated storage platform system and a method thereof, which intercourse with different storage space providers through a plurality of adaption modules, wherein the adaption modules respectively have adaption settings corresponding to different types of storage spaces, whereby various types of storage spaces in the networks are integrated in the storage platform of the present invention.

Yet another objective of the present invention is to provide an integrated storage platform system and a method thereof, which store the account numbers and passwords of various storage spaces in the configuration file of the storage administration module, whereby the user is exempted from memorizing the account numbers and passwords of various storage spaces or entering the account numbers and passwords when he intends to access the storage spaces.

A further objective of the present invention is to provide an integrated storage platform system and a method thereof, which present the storage spaces as file folders in the user's computer, whereby the user can access the storage spaces conveniently.

To achieve the abovementioned objectives, the present invention proposes an integrated storage platform system, which comprises at least one adaption module, an access interface and a storage administration module. The adaption modules respectively link to storage spaces and undertake a plurality of adaption settings corresponding to the storage spaces. The user operates the access interface to access the storage spaces through the storage administration module and the adaption modules. The access interface further presents the results of access to the user. One end of the storage administration module connects with the adaption modules, and the other end of the storage administration module connects with the access interface. The storage administration module processes the files of the storage spaces.

The present invention also proposes an access method of an integrated storage platform system, which enables users to add, delete, edit, and look up storage spaces, and which comprises steps: an access interface sending a command of a user to a storage administration module; the storage administration module selecting an appropriate adaption module from at least one adaption module according to the command, and linking to a corresponding storage space of at least one storage space through the appropriate adaption module; and presenting to the user a content of the corresponding storage space through the access interface to enable the user to access the corresponding storage space through the storage administration module and the appropriate adaption module.

Below, embodiments are described in detail to make easily understood the objectives, technical contents, characteristics and accomplishments of the present invention.

DETAILED DESCRIPTION OF THE INVENTION

Figure 1:
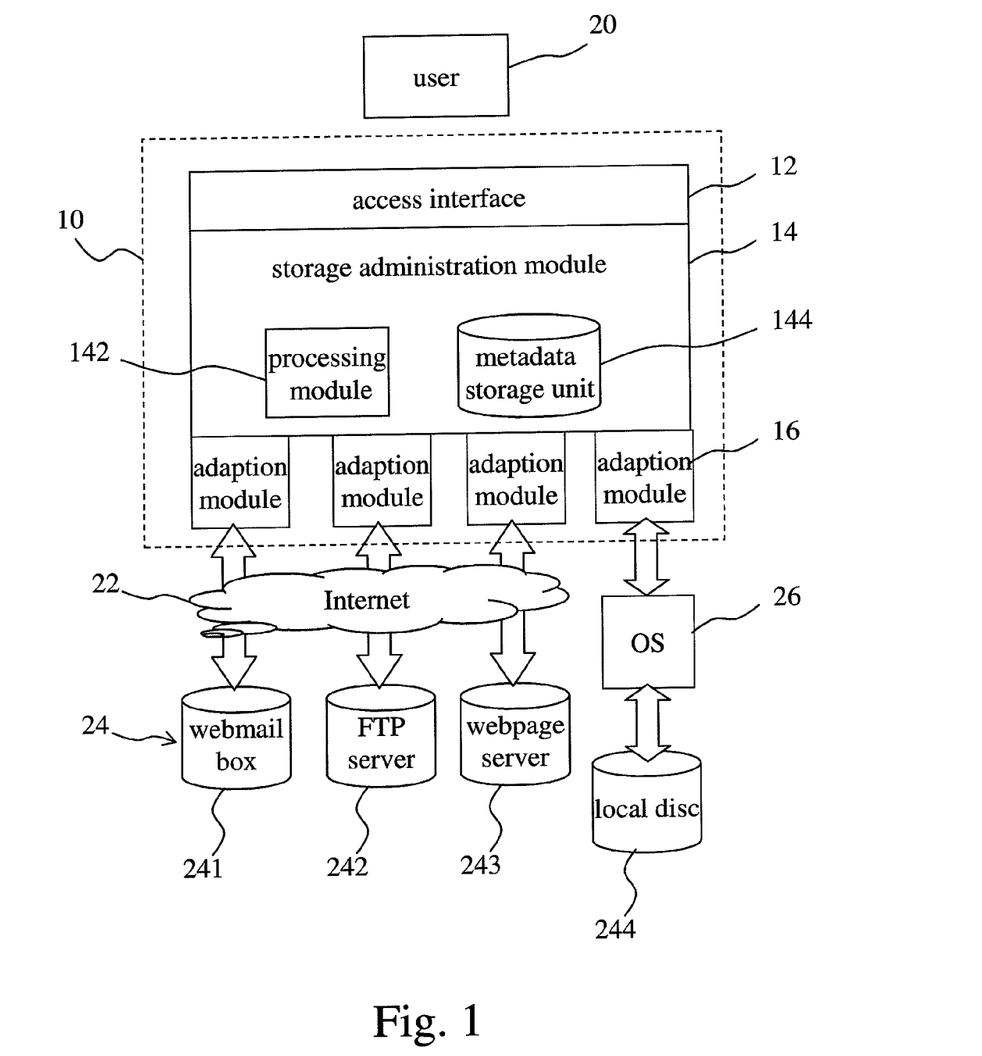
FIG. 1 is a block diagram schematically showing an ISP system according to one embodiment of the present invention.

The present invention discloses an integrated storage platform (ISP) system and a method thereof. Refer to FIG. 1 a block diagram schematically showing an ISP system according to one embodiment of the present invention. The ISP system of the present invention comprises an integrated storage platform 10. The integrated storage platform 10 further comprises an access interface 12, a storage administration module 14 and at least one adaption module 16. Each adaption module 16 connects with a storage space 24 and undertakes a plurality of related adaption settings. The user operates the access interface 12 is a user's operating interface. The user 20 operates the access interface 12 to access the storage space 24 through the storage administration module 14 and adaption module 16. The access interface 12 presents the access results to the user 20. The storage administration module 14 connects with the adaption module 16 at one end and connects with the access interface 12 at another end, enabling the data access between the user 20 and the storage space 24. Each storage space 24 stores at least one file.

Different services need different adaption modules 16. Each adaption module 16 has adaption settings corresponding to the related storage space 24. The storage spaces 24 include a cloud-based webmail box 241, an FTP server 242, a webpage server 243, and a local disc 244. The cloud-based webmail box 241 and the FTP server 242 are implemented by the standard protocol or the corresponding API (Application Programming Interface). The webpage server 243 is implemented by the web browser (the HTTP or HTML webpage server), such as the Dropio, Share1t, or Picasa webpage server. The local disc 244 is accessed through an operating system 26. The cloud-based webmail box 241, FTP server 242 and webpage server 243 are accessed through the Internet 22.

The storage spaces 24 provided by different storage providers (SP) are respectively presented as different folders in the user side.

The authentication information, such as the user's account numbers and passwords, is stored in the storage administration module 14 beforehand. While the user intends to access one storage space 24, the authentication is undertaken between the storage administration module 14 and the storage space 24 through the adaption modules 16.

Figure 2:
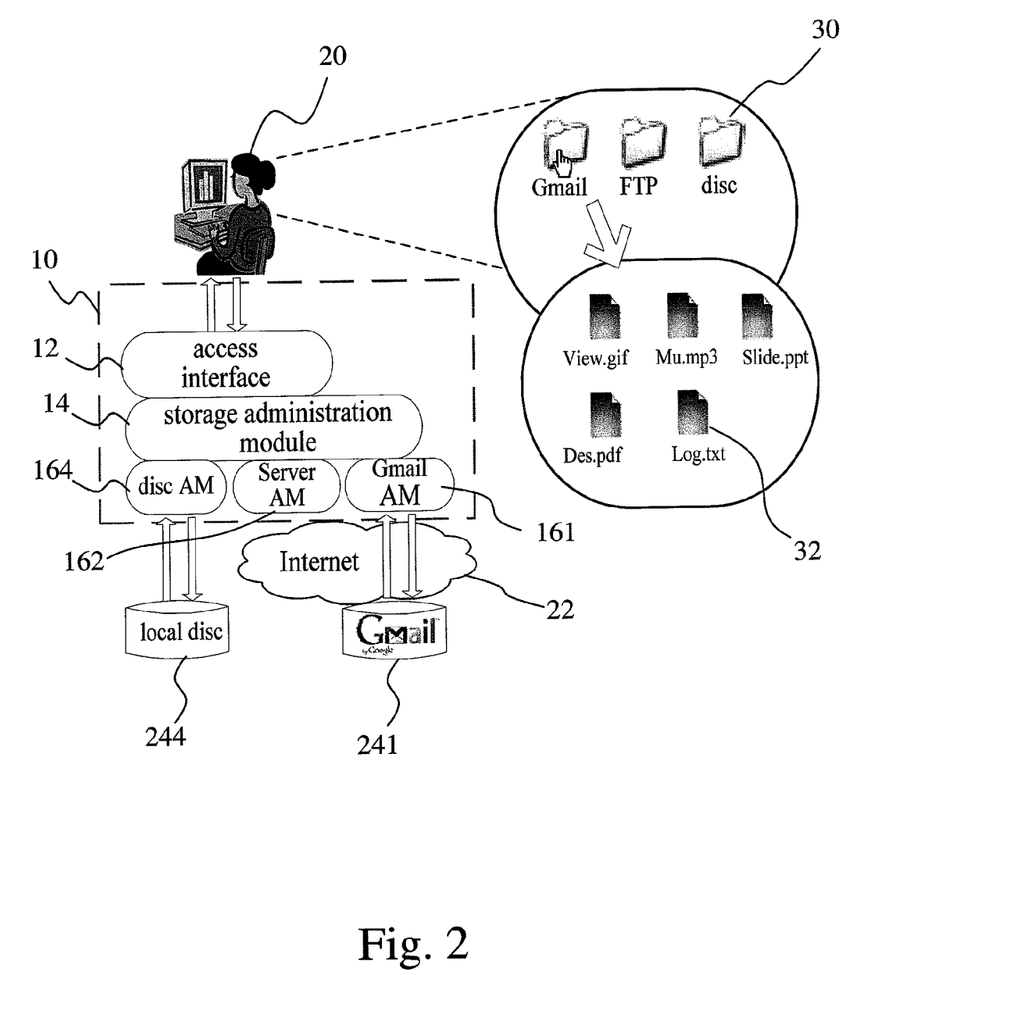
FIG. 2 is a diagram schematically showing a user of an ISP system accesses a storage space according to one embodiment of the present invention.

Refer to FIG. 2 schematically showing that a user accesses a storage space via an integrated storage platform system according to one embodiment of the present invention. In this embodiment, the user 20 possesses three storage spaces 24: a webmail box 241, an FTP server (not shown in the FIG. 2) and a local disc 244. The webmail box is a Gmail box. Therefore, the integrated storage platform system 10 includes three adaption modules: a Gmail adaption module 161 (Gmail AM), a server adaption module 162 (server AM) and a disc adaption module 164 (disc AM). Thus, file folders 30 of Gmail, FTP and a disc are presented on the computer of the user 20. While intending to duplicate a piece of data from the webmail box 241 to the local disc 244, the user 20 clicks on the Gmail folder, which is equal to giving a command to the integrated storage platform system 10. Thus, the access interface 12 transfers the command to the storage administration module 14. Because it is the Gmail folder that is clicked on by the user 20, the storage administration module 14 transfers the command to the Gmail adaption module 161. Then, the Gmail adaption module 161 links to the webmail box 241 through the Internet 22 and returns the names of the files in the webmail box 241 to the user 20. Thus, the user 20 can see that the Gmail folder 30 contains five files 32 and selects one of them. Then, the selected file is duplicated to the local disc 244 via the storage administration module 14 and the disc adaption module 164.

In one embodiment, the user 20 sends a command to the storage administration module 14 through the access interface 12, and the storage administration module 14 then returns the contents of the storage space to the user 20. Thereby, the user 20 can communicate with and operate the storage spaces more easily.

Figure 3:
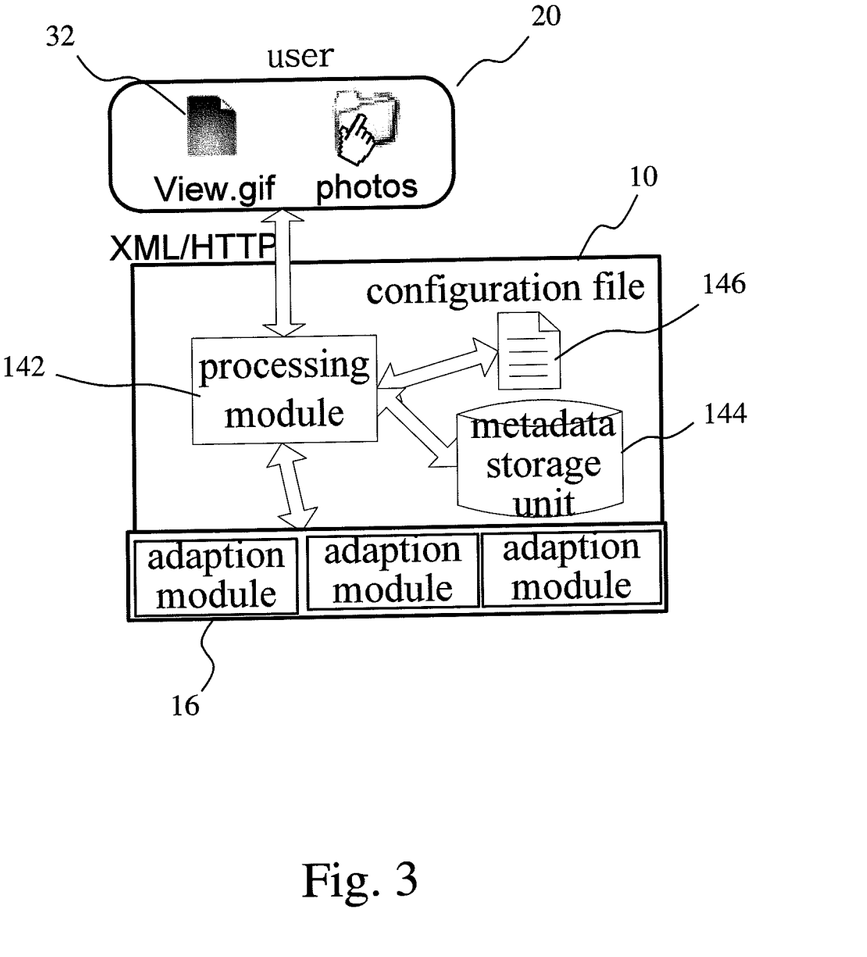
FIG. 3 is a block diagram schematically showing a storage administration module of an ISP system according to one embodiment of the present invention.

All the user's commands work in a way of file accessing. Refer to FIG. 3. The integrated storage platform 10 further comprises a processing module 142, a metadata storage unit 144, and a configuration file 146, which are all arranged in the storage administration module 14 (refer to FIG. 1 again). The integrated storage platform 10 uses the processing module 142 to execute the commands to delete, rename, and duplicate the files 32. The processing module 142 stores the names and routes of the files 32 in the metadata storage unit 144. The configuration file 146 stores the authentication information and the relationships between adaption modules 16. The metadata storage unit 144 and the configuration file 146 implement the processing module 142 to process the files 32. For example, in order to transfer files via different adaption modules 16, the integrated storage platform 10 has to learn the related adaption modules 16 beforehand from the configuration file 146.

Figure 4:
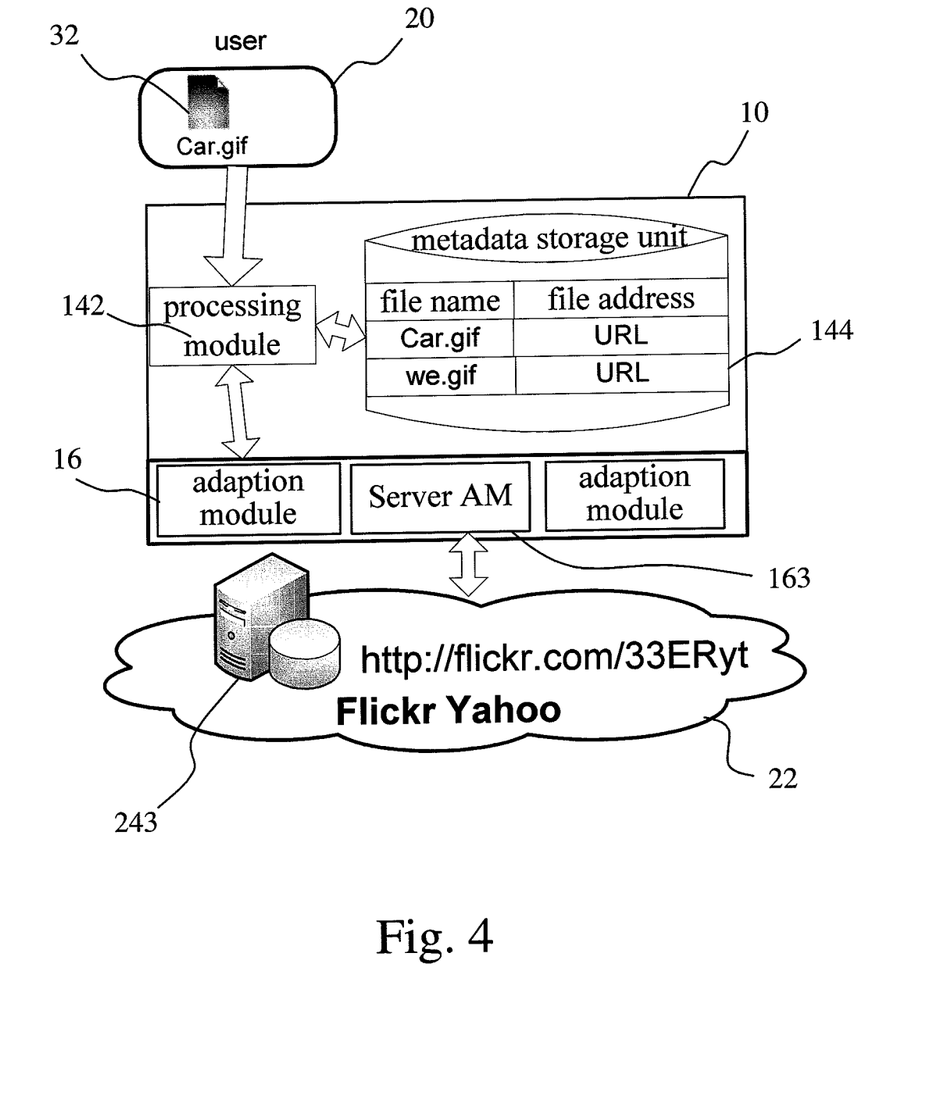
FIG. 4 is a block diagram schematically showing names and addresses of files are accessed from a storage administration module of an ISP system according to one embodiment of the present invention.

Refer to FIG. 4 a block diagram schematically showing names and addresses of files are accessed from a storage administration module of an ISP system according to one embodiment of the present invention. In the present invention, the resources of all the storage providers (SP) are also stored in form of files. For example, while the user 20 intends to store a file 32 (the graphic file Car.gif) into the webpage server 243, the processing module 142 transfers file 32 to the webpage server 243 through a webpage server adaption module 163 and the Internet 22. At the same time, the processing module 142 stores the address (http://flickr.com/33ERyt) and the name of the file into the metadata storage unit 144. The present invention virtualizes the physical resources into metadata, and operates the metadata rather than the physical resources.

Figure 5:
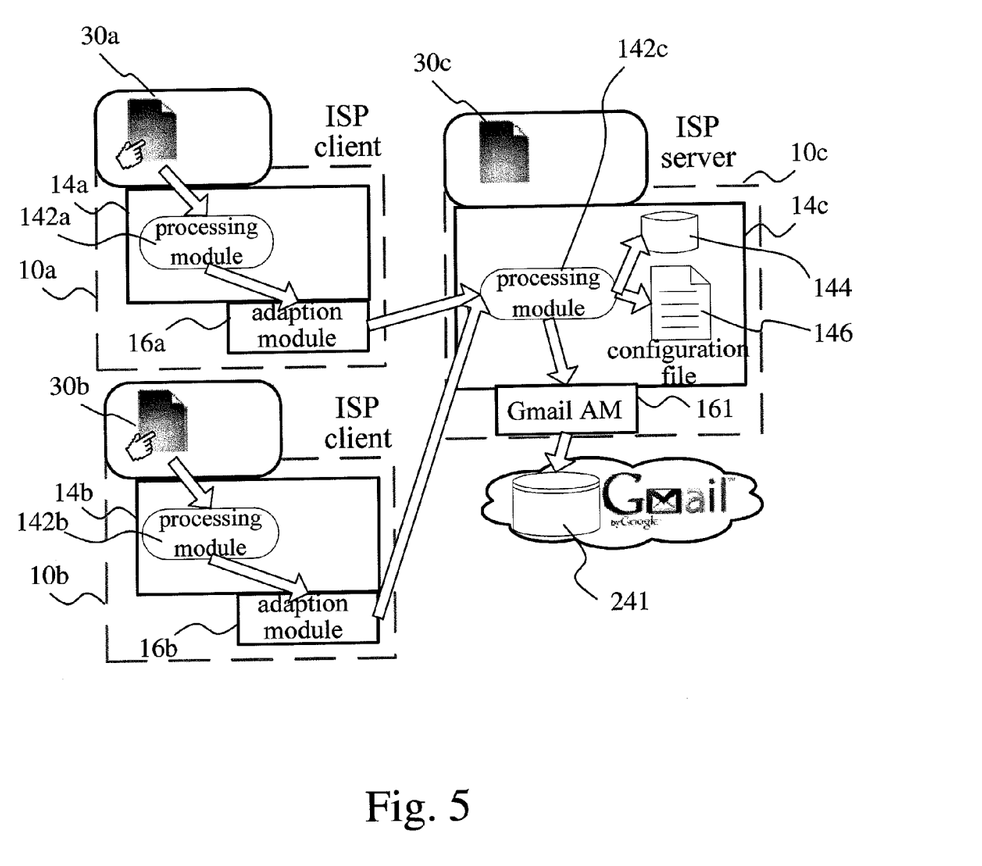
FIG. 5 is a diagram schematically showing accessing activities among several ISP according to one embodiment of the present invention.

Suppose that a user intends to share his files stored in the storage spaces. ISP of the user would be regarded as an ISP (Integrated Storage Platform) server, and the other users linking to the ISP server are the clients of ISP. Refer to FIG. 5. In such a case, two different types of records are stored in the metadata storage unit 144, including the metadata of the virtualized files and the metadata of the shared files.

In FIG. 5, the files are stored in the Gmail storage space 241 of the ISP server and presented as files 30c to the user of the ISP server. Two ISP clients use the integrated storage platforms 10a, 10b and 10c, which are the same as the ISP server, to link to the processing module 142c of the ISP server through the adaption modules 16a and 16b. The processing module 142c obtains the authentication information from the configuration file 146 and obtains the names and addresses of the files 30a, 30b and 30c from the metadata storage unit 144. The file is transferred to the adaption modules 16a and 16b through the integrated storage platform 10c. Then, the processing modules 142a and 142b process the file and present the file to the two users of ISP clients. In the whole access process, neither the users of ISP clients nor the user of ISP server needs to enter the account number or password.

Figure 6A:
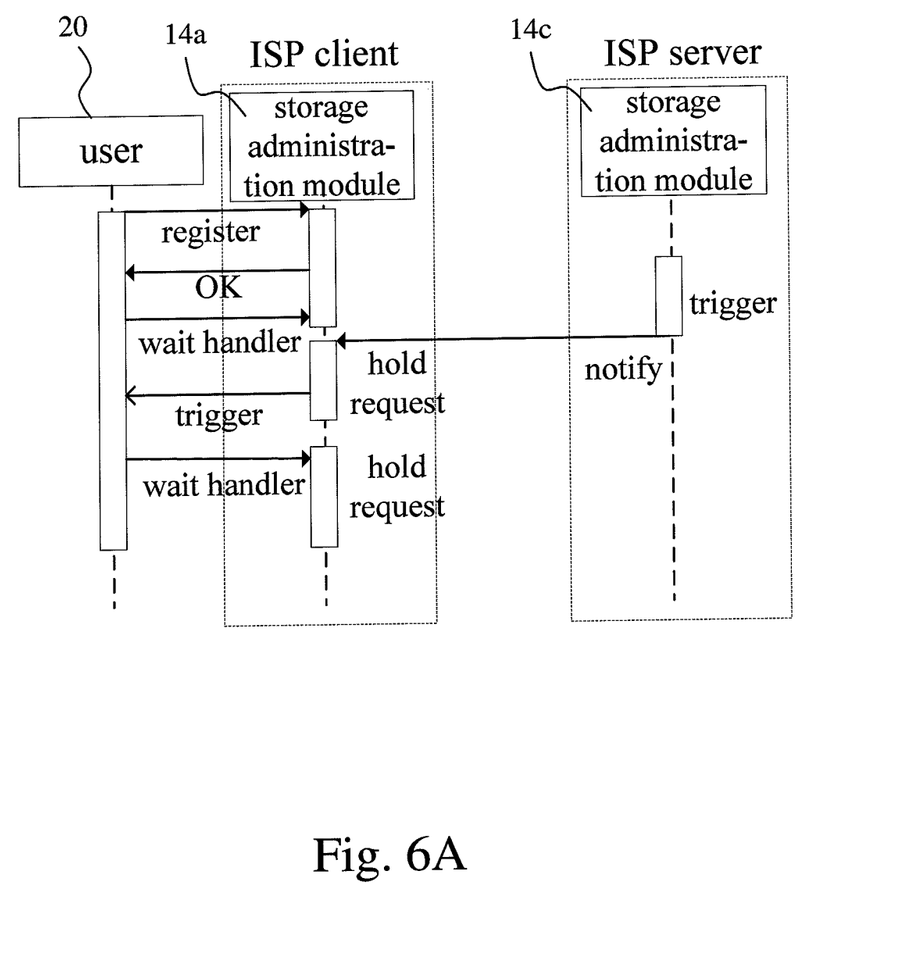
FIG. 6A is a flowchart showing a requesting process between at least two ISPs according to one embodiment of the present invention.

Refer to FIG. 6A a flowchart showing a requesting process between at least two ISPs according to one embodiment of the present invention. Firstly, the user 20 sends out a registering information for authentication. After the storage administration module 14a in the client side ISP has confirmed the user 20, the user 20 begins to wait for the storage administration module 14a to link to the storage administration module 14c and ask for a file. Next, the storage administration module 14c is triggered to send a notification to the storage administration module 14a. The storage administration module 14a holds the requesting state and triggers the user 20 to prepare for operation.

Figure 6B:
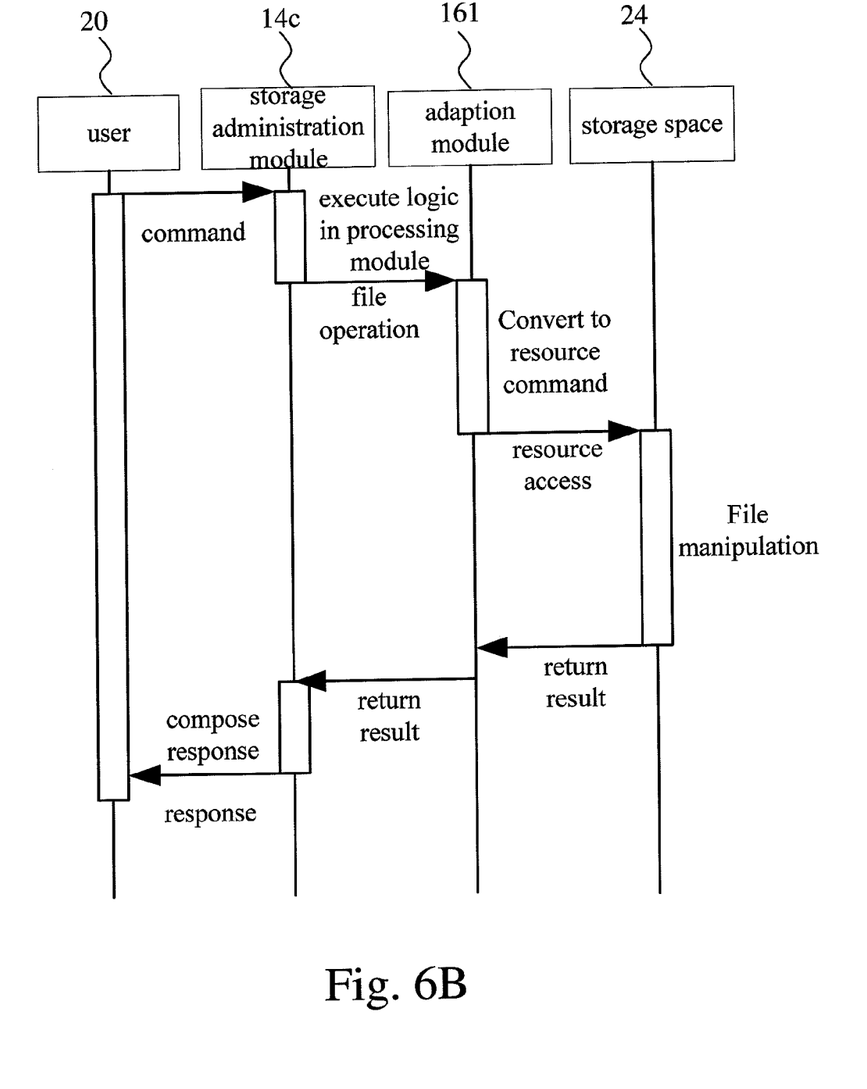
FIG. 6B is a flowchart showing a fundamental process of accessing a file according to one embodiment of the present invention.

Refer to FIG. 6B a flowchart showing a fundamental process of accessing a file according to one embodiment of the present invention. The user 20 sends a UI (User's Interface) command to the storage administration module 14c. The processing module of the storage administration module 14c executes the logic of the command and sends the command to the adaption module 161 in form of a file. The adaption module 161 converts the command into a resource requesting command for accessing a file. After receiving the resource requesting command, the storage space 24 returns the file to the user's computer through the adaption module 161 and the storage administration module 14c. Thus is completed a response to the command.

Figure 6C:
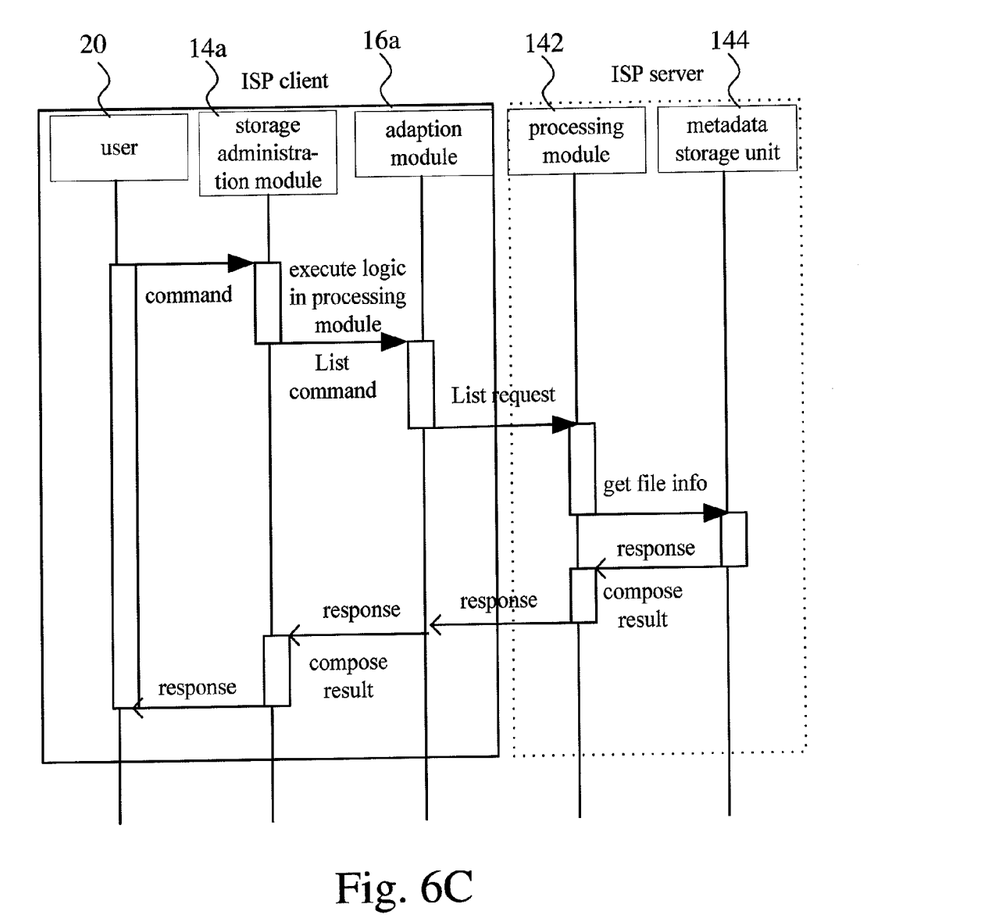
FIG. 6C is a flowchart showing the process of confirming the shared file according to one embodiment of the present invention.

Refer to FIG. 6C a flowchart showing the process of confirming the shared file according to one embodiment of the present invention. There are an ISP client and an ISP server in FIG. 6C. Firstly, a UI command is sent to the storage administration module 14a. The processing module of the storage administration module 14a executes the logic of the command, collates the request of the command, and sends the request lists to the adaption module 16a. The adaption module 16a sends the request list to the ISP server. The processing module 142 would obtain from the metadata storage unit 144 all the information of the shared file in the ISP server and returns the information to the ISP client.

In conclusion, the present invention proposes an integrated storage platform system to integrate cloud-based storage spaces, network-based file systems and local file systems, whereby the user can use a single personal interface to access the storage spaces provided by different storage space providers. While having a new cloud-based storage space, the user can continue using the original interface via only installing a corresponding adaption module. The present invention enables the user to continue the previous operating experience and use the original operating interface. Further, the present invention also enables the user to administrate numerous storage spaces simultaneously.

The embodiments described above are only to exemplify the present invention but not to limit the scope of the present invention. Any equivalent modification or variation according to the spirit or characteristic of the present invention is to be also included within the scope of the present invention.

What is claimed is:

1. An integrated storage platform system comprising
   at least one adaption module respectively connecting with at least one storage space and each performing a plurality of adaption settings corresponding to one said storage space;
   a storage administration module connecting with said at least one adaption module and processing at least one file of said at least one storage space; and
   an access interface connecting said storage administration module, operated by a user to access said at least one storage space through said storage administration module and said at least one adaption module, and presenting results of access to said user, wherein
   according to different providers of said at least one storage space, said at least one storage space is respectively presented as different folders on a computer of said user.

2. The integrated storage platform system according to claim 1, wherein said at least one storage space is a disc of a computer of said user, and wherein said adaption settings are related to an operating system of said user.

3. The integrated storage platform system according to claim 1, wherein said at least one storage space is an external storage space accessed through a network, and wherein said adaption settings are related to a standard protocol, API (Application Programming Interface), or a webpage server.

4. The integrated storage platform system according to claim 1, wherein said user sends a command to said storage administration module, and said storage administration module intercourses with said user via returning a content of said at least one storage space.

5. The integrated storage platform system according to claim 1, wherein said storage administration module further comprises a processing module responsible for deleting, renaming and duplicating said at least one file, and adding a new file.

6. The integrated storage platform system according to claim 5, wherein said processing module stores names and routes of said at least one file in a metadata storage unit, and wherein said metadata storage unit is arranged in said storage administration module.

7. The integrated storage platform system according to claim 1, wherein said storage administration module uses an authentication information of said user to undertake authentication with said at least one storage space through said at least one adaption module.

8. An access method of an integrated storage platform system, which is able to add, delete, edit, and look up storage spaces, comprising steps:
   an access interface sending a command of a user to a storage administration module;
   said storage administration module selecting an appropriate adaption module from at least one adaption module according to said command, and linking to a corresponding storage space of at least one storage space through said appropriate adaption module; and
   presenting a content of said corresponding storage space to said user through said access interface to enable said user to access said corresponding storage space through said storage administration module and said appropriate adaption module wherein
   according to different providers said at least one storage space, said at least one storage space is respectively presented as different folders of said user.

9. An access method of an integrated storage platform system according to claim 8, wherein said at least one storage space is a disc of a computer of said user, which is accessed with an operating system of said user.

10. An access method of an integrated storage platform system according to claim 8, wherein said at least one storage space is an external storage space accessed through a network via a standard protocol, API (Application Programming Interface), or a webpage server.

11. The access method of an integrated storage platform system according to claim 8, wherein said user sends a command to said storage administration module, and said storage administration module intercourses with said user via returning a content of said at least one storage space.

12. The access method of an integrated storage platform system according to claim 8, wherein said storage administration module further comprises a processing module responsible for deleting, renaming and duplicating said at least one file, and adding a new file.

13. The access method of an integrated storage platform system according to claim 12, wherein said processing module stores names and routes of said at least one file in a metadata storage unit, and wherein said metadata storage unit is arranged in said storage administration module.

14. The access method of an integrated storage platform system according to claim 8, wherein said storage administration module uses an authentication information of said user to undertake authentication with, said at least one storage space through said at least one adaption module.

\* \* \* \* \*